United States Patent
Meyers et al.

(10) Patent No.: US 7,027,903 B2
(45) Date of Patent: *Apr. 11, 2006

(54) ROLL OVER STABILITY CONTROL FOR AN AUTOMOTIVE VEHICLE

(75) Inventors: Joseph Carr Meyers, Farmington Hills, MI (US); Todd Allen Brown, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/827,219

(22) Filed: Apr. 19, 2004

(65) Prior Publication Data

US 2004/0199314 A1 Oct. 7, 2004

Related U.S. Application Data

(60) Division of application No. 10/378,225, filed on Mar. 3, 2003, now Pat. No. 6,834,218, which is a continuation of application No. 09/682,974, filed on Nov. 5, 2001, now Pat. No. 6,529,803, which is a continuation-in-part of application No. 09/468,234, filed on Dec. 21, 1999, now Pat. No. 6,263,261.

(51) Int. Cl.
  *G05D 1/00* (2006.01)
(52) U.S. Cl. .................... 701/38; 701/1; 701/41; 303/189
(58) Field of Classification Search ............ 701/1, 701/72, 78, 83, 38, 41; 180/197, 271, 282, 180/276, 283; 303/146, 166, 189; 340/429, 340/440

See application file for complete search history.

(56) References Cited

U.S. PATENT DOCUMENTS

| | | | | |
|---|---|---|---|---|
| 4,976,330 A | * | 12/1990 | Matsumoto | 180/197 |
| 4,998,593 A | * | 3/1991 | Karnopp et al. | 180/408 |
| 5,089,967 A | * | 2/1992 | Haseda et al. | 701/78 |
| 5,224,765 A | * | 7/1993 | Matsuda | 303/9.62 |
| 5,335,176 A | * | 8/1994 | Nakamura | 701/45 |
| 5,408,411 A | * | 4/1995 | Nakamura et al. | 701/48 |
| 5,446,658 A | * | 8/1995 | Pastor et al. | 701/1 |
| 5,610,575 A | * | 3/1997 | Gioutsos | 340/429 |
| 6,170,594 B1 | * | 1/2001 | Gilbert | 180/282 |
| 6,438,464 B1 | * | 8/2002 | Woywod et al. | 701/1 |

* cited by examiner

*Primary Examiner*—Richard M. Camby
(74) *Attorney, Agent, or Firm*—Raymond L. Coppiellie; Artz & Artz, P.C.

(57) ABSTRACT

A stability control system (24) for an automotive vehicle as includes a plurality of sensors (28–37) sensing the dynamic conditions of the vehicle and a controller (26) that controls a distributed brake pressure to reduce a tire moment so the net moment of the vehicle is counter to the roll direction. The sensors include a speed sensor (30), a lateral acceleration sensor (32), a roll rate sensor (34), and a yaw rate sensor (20). The controller (26) is coupled to the speed sensor (30), the lateral acceleration sensor (32), the roll rate sensor (34), the yaw rate sensor (28). The controller (26) determines a roll angle estimate in response to lateral acceleration, roll rate, vehicle speed, and yaw rate. The controller (26) changes a tire force vector using brake pressure distribution in response to the relative roll angle estimate.

127 Claims, 5 Drawing Sheets

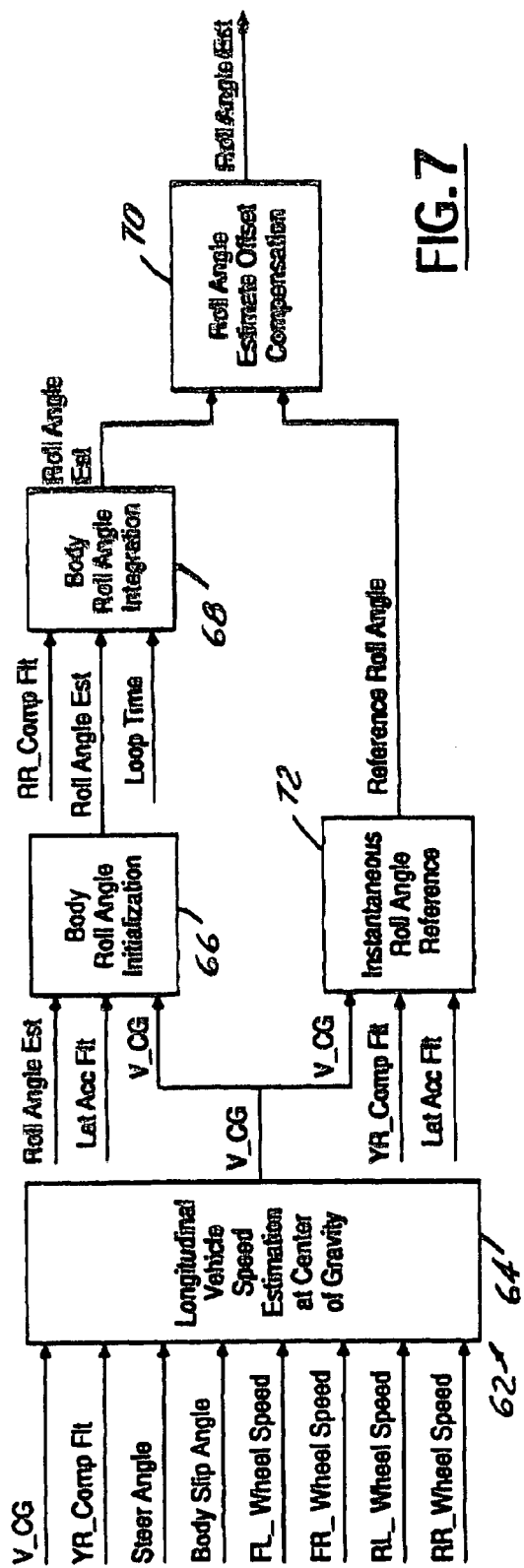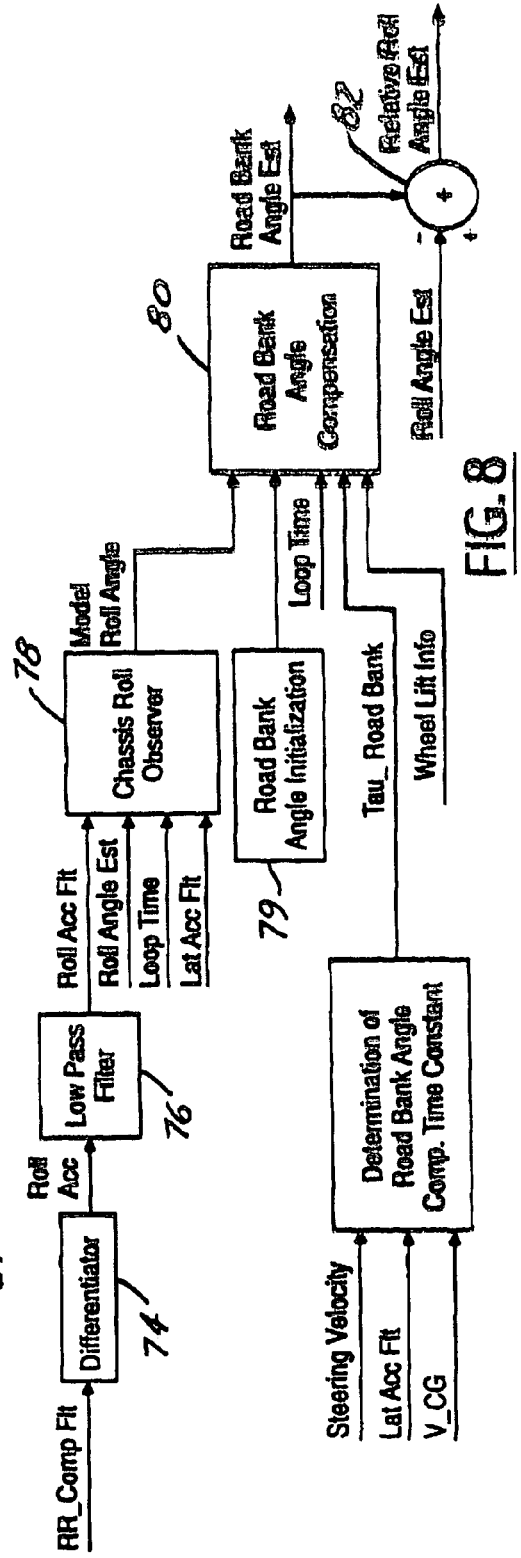
FIG. 7
FIG. 8

ROLL OVER STABILITY CONTROL FOR AN AUTOMOTIVE VEHICLE

RELATED APPLICATIONS

The present application is a divisional of U.S. patent application Ser. No. 10/378,225 filed Mar. 3, 2003, now U.S. Pat. No. 6,834,218, which is a continuation of U.S. patent application 09/682,974 filed Nov. 5, 2001, now U.S. Pat. No, 6,529,803, which is a continuation of U.S. patent application Ser. No. 09/468,234 filed Dec. 21, 1999, now U.S. Pat. No. 6,263,261.

TECHNICAL FIELD

The present invention relates generally to a dynamic behavior control apparatus for an automotive vehicle, and more specifically, to a method and apparatus for controlling the roll characteristics of the vehicle by changing a brake pressure distribution changing a steering angle or combination of both.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the roll over characteristic of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the vehicle body on a plane or nearly on a plane parallel to the road surface. Roll over control is maintaining the vehicle wheels on the road surface. One system of tilt control is described in U.S. Pat. No. 5,869,943. The '943 patent uses the combination of yaw control and tilt control to maintain the vehicle body horizontal while turning. The system is used in conjunction with the front outside wheels only. To control tilt, a brake force is applied to the front outside wheels of a turn. One problem with the application of a brake force to only the front wheels is that the cornering ability of the vehicle may be reduced. Another disadvantage of the system is that the yaw control system is used to trigger the tilt control system. During certain vehicle maneuvers, the vehicle may not be in a turning or yawing condition but may be in a rollover condition. Such a system does not address preventing rollover in a vehicle.

It would therefore be desirable to provide a roll stability system that detects a potential rollover condition as well as to provide a system not dependent upon a yaw condition.

SUMMARY OF THE INVENTION

It is therefore an object of the invention to provide a roll control system for use in a vehicle that is not dependent upon the turning condition of the vehicle.

In one aspect of the invention, stability control system for an automotive vehicle includes a plurality of sensors sensing the dynamic conditions of the vehicle and a controller that controls a distributed brake pressure to reduce a tire moment so the net moment of the vehicle is counter to the roll direction. The sensors include a speed sensor, a lateral acceleration sensor, a roll rate sensor, and a yaw rate sensor. A controller is coupled to the speed sensor, the lateral acceleration sensor, the roll rate sensor, the yaw rate sensor. The controller determines a roll angle estimate in response to lateral acceleration, roll rate, vehicle speed, and yaw rate. The controller determines a brake pressure distribution in response to the relative roll angle estimate. The controller may also use longitudinal acceleration and pitch rate to determine the roll angle estimate.

In a further aspect of the invention, a method of controlling roll stability of the vehicle comprises determining a roll angle estimate in response to lateral acceleration, roll rate, vehicle speed, and yaw rate, and determining a brake pressure distribution in response to the relative roll angle estimate.

One advantage of the invention is that the turning radius of the vehicle is not affected by the roll stability control.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 7 is a flow chart of chassis roll angle estimation and compensation.

FIG. 8 is a flow chart of a relative roll calculation.

DESCRIPTION OF THE PREFERRED EMBODIMENT

Figure 1:
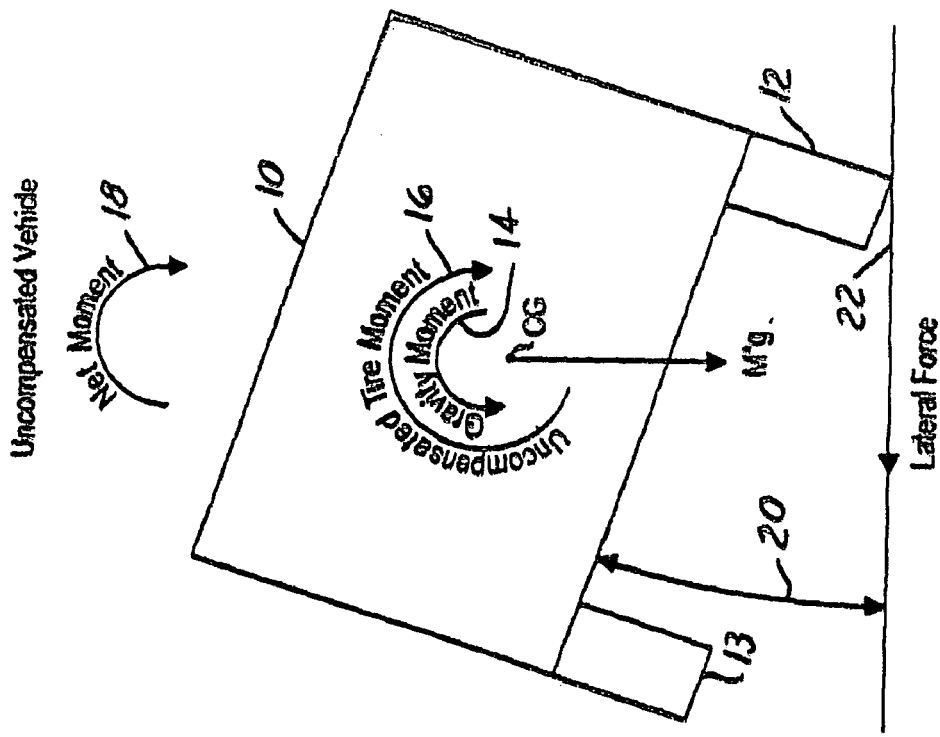
FIG. 1 is a diagrammatic rear view of a vehicle with force vectors not having a roll stability system according to the present invention.

Referring to FIG. 1, an automotive vehicle 10 without a rollover stability system of the present invention is illustrated with the various forces and moments thereon during a rollover condition. Vehicle 10 has right and left tires 12 and 13 respectively. The vehicle may also have a number of different types of steering configurations including having each of the front and rear wheels configured with an independently controllable actuator, the front and rear wheels having a conventional type system in which both of the front wheels are controlled together and both of the rear wheels are controlled together, a system having conventional front steering and independently controllable rear steering for each of the wheels or vice versa. Variation of a control system for each will be described below. Generally, the vehicle has a weight represented as M*g at the center of gravity of the vehicle. A gravity moment 14 acts about the center of gravity (CG) in a counter-clockwise direction. A tire moment 16 acts in a clockwise direction about the center of gravity. Thus, the net moment 18 acting upon the vehicle is in a clockwise direction and thus increases the roll angle 20 of the vehicle. The lateral force 22 at the tire 12 on the ground (tire vector) is a significant force to the left of the diagram capable of overturning the vehicle if uncorrected.

Figure 2:
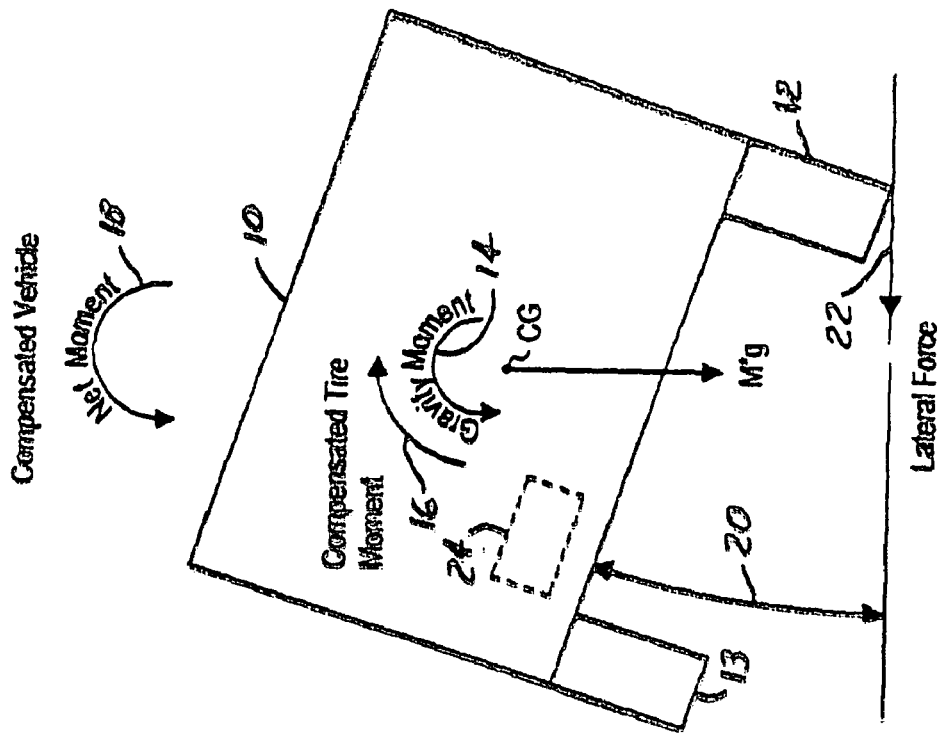
FIG. 2 is a diagrammatic rear view of a vehicle with force vectors having a roll stability system according to the present invention.

Referring now to FIG. 2, a roll stability control system 24 is included within vehicle 10, which is in a roll condition. The forces illustrated in FIG. 2 are given the same reference numerals as the forces and moments in FIG. 1. In FIG. 2, however, roll stability controller 24 reduces the tire moment 16 to provide a net moment 18 in a counter-clockwise direction. Thus, the tire vector or lateral force 22 at tire 12 is reduced as well. This tendency allows the vehicle to tend toward the horizontal and thus reduce angle 20.

Figures 3, 4, 5, 6:
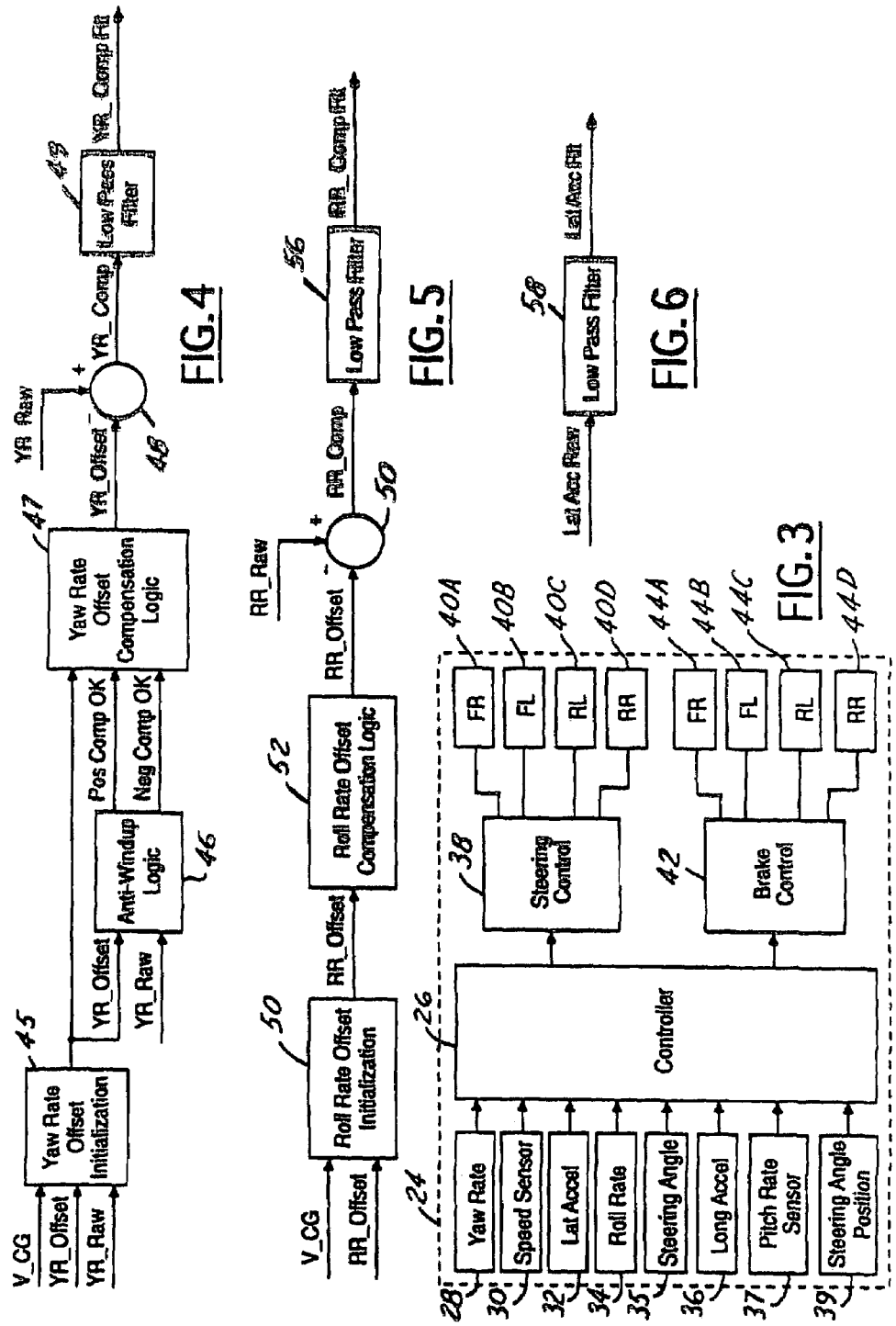
FIG. 3 is a block diagram of a roll stability system according to the present invention.
FIG. 4 is a flow chart of a yaw rate determination according to the present invention.
FIG. 5 is a flow chart of roll rate determination according to the present invention.
FIG. 6 is a flow chart of a lateral acceleration determination according to the present invention.

Referring now to FIG. 3, roll stability control system 24 has a controller 26 used for receiving information from a number of sensors which may include a yaw rate sensor 28, a speed sensor 30, a lateral acceleration sensor 32, a roll rate sensor 34, a steering angle sensor 35, a longitudinal acceleration sensor 36, a pitch rate sensor 37 steer and a steering angle position sensor 39. Lateral acceleration, roll orientation and speed may be obtained using a global positioning system (Global Positioning System). Based upon inputs from the sensors, controller 26 controls a tire force vector by steering control 38 as will be further described below or changing the steering angle of front right actuator 40a, front left actuator 40b, rear left actuator 40c and/or rear right actuator 40d. As described above, two or more of the actuators may be simultaneously controlled. For example, in a rack-and-pinion system, the two wheels coupled thereto are simultaneously controlled. Brake control 42 controls the front right brake 44a, the front left brake 44b, the rear left brake 44c, and the right rear brake 446d. Based on the inputs from sensors 28 through 39, controller 26 determines a roll condition and controls the brake pressure of the brakes on the appropriate side of the vehicle and/or steering angle. The braking pressure and/or steering angle is balanced on the side of the vehicle to be controlled between the front and rear brakes to minimize the induced yaw torque and induced path deviation. Depending on the desired sensitivity of the system and various other factors, not all the sensors 28–39 may be used in a commercial embodiment.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chasse components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an act of suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The potential of a roll condition is associated with a zero normal load or a wheel lift condition on one or more of the wheels. A zero normal load, and thus a roll condition may be determined by sensing the force or torque associated with the loading condition of one or more suspension or chassis components including a pressure transducer in a suspension actuator. Similarly, a load cell or a strain gauge may be mounted to measure the force in a suspension component. The zero normal load condition may be used alone or in combination with other displacement or inertial measurements to accurately monitor the vehicle roll condition.

The power steering system actuation can be monitored to infer the normal load on the steered wheels. The steering load can be monitored by measuring one or more of the absolute or relative motor load, the steering system pressure of the hydraulic lines, tire lateral force sensor or sensors, a longitudinal tire force sensor(s), vertical tire force sensor(s) or tire sidewall torsion sensor(s) The steering system measurements used depend on the steering system technology and the sensors available on the vehicle.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity (V_CG). Various other algorithms are known to those skilled in the art. Speed may also be obtained from a transmission sensor. For example, if speed is determined while speeding up or braking around a corner, the lowest or highest wheel speed may be not used because of its error. Also, a transmission sensor may be used to determine vehicle speed.

Referring now to FIG. 4, the yaw rate sensor 28 generates a raw yaw rate signal (YR_Raw). A yaw rate compensated and filtered signal (YR_CompFlt) is determined. The velocity of the vehicle at center of gravity (V_CG), the yaw rate offset (YR_Offset) and the raw yaw rate signal from the yaw rate sensor (YR_Raw) are used in a yaw rate offset initialization block 45 to determine an initial yaw rate offset. Because this is an iterative process, the yaw rate offset from the previous calculation is used by yaw rate offset initialization block 45. If the vehicle is not moving as during startup, the yaw rate offset signal is that value which results in a compensated yaw rate of zero. This yaw rate offset signal helps provide an accurate reading. For example, if the vehicle is at rest, the yaw rate signal should be zero. However, if the vehicle is reading a yaw rate value then that yaw rate value is used as the yaw rate offset. The yaw rate offset signal along with the raw yaw rate signal is used in the anti-windup logic block 46. The anti-windup logic block 46 is used to cancel drift in the yaw rate signal. The yaw rate signal may have drift over time due to temperature or other environmental factors. The anti-windup logic block also helps compensate for when the vehicle is traveling constantly in a turn for a relatively long period. The anti-windup logic block 46 generates either a positive compensation OK signal (Pos Comp OK) or a negative compensation OK signal (Neg Comp OK). Positive and negative in this manner have been arbitrarily chosen to be the right and left direction with respect to the forward direction of the vehicle, respectively. The positive compensation OK signal, the negative compensation OK signal and the yaw rate offset signal are inputs to yaw rate offset compensation logic block 47.

The yaw rate offset compensation logic block 47 is used to take data over a long period of time. The data over time should have an average yaw of zero. This calculation may be done over a number of minutes. A yaw rate offset signal is generated by yaw rate offset compensation logic 47. A summing block 48 sums the raw yaw rate signal and the yaw rate offset signal to obtain a yaw rate compensated signal (YR_Comp).

A low pass filter 49 is used to filter the yaw rate compensated signal for noise. A suitable cutoff frequency for low pass filter 49 is 20 Hz.

Referring now to FIG. 5, a roll rate compensated and filtered signal (RR_CompFlt). The roll rate compensated and filtered signal is generated in a similar manner to that described above with respect to yaw rate. A roll rate offset initialization block 50 receives the velocity at center of gravity signal and a roll rate offset signal. The roll rate offset signal is generated from a previous iteration. Like the yaw rate, when the vehicle is at rest such as during startup, the roll rate offset signal is zero.

A roll rate offset compensation logic block 52 receives the initialized roll rate offset signal. The roll rate offset compensation logic generates a roll rate offset signal which is combined with the roll rate raw signal obtained from the roll rate sensor in a summing block 54. A roll rate compensated signal (RR_Comp) is generated. The roll rate compensated signal is filtered in low pass filter 56 to obtain the roll rate compensated and filtered signal that will be used in later calculations.

Referring now to FIG. 6, the raw lateral acceleration signal (Lat Acc Raw) is obtained from lateral acceleration sensor 32. The raw lateral acceleration signal is filtered by a low pass filter to obtain the filtered lateral acceleration signal (Lat Acc Flt). The filter, for example, may be a 20 Hz low pass filter.

Referring now to FIG. 7, a roll angle estimation signal (RollAngleEst) is determined by chassis roll estimation and compensation procedure 62. Block 64 is used to obtain a longitudinal vehicle speed estimation at the center of gravity of the vehicle. Various signals are used to determine the longitudinal vehicle speed at the center of gravity including the velocity of the vehicle at center of gravity determined in a previous loop, the compensated and filtered yaw rate signal determined in FIG. 4, the steering angle, the body slip angle, the front left wheel speed, the front right wheel speed, the rear left wheel speed, and the rear right wheel speed.

The new velocity of the center of gravity of the vehicle is an input to body roll angle initialization block 66. Other inputs to body roll angle initialization block 66 include roll angle estimate from the previous loop and a filtered lateral acceleration signal derived in FIG. 6. An updated roll angle estimate is obtained from body roll angle initialization. The updated roll angle estimate, the compensation and filtered roll rate determination from FIG. 5, and the time of the loop is used in body roll angle integration block 68. The updated roll angle estimate is equal to the loop time multiplied by the compensated and filtered roll rate which is added to the previous roll angle estimate obtained in block 66. The updated roll angle estimate is an input to roll angle estimate offset compensation block 70.

The velocity at the center of gravity of the vehicle is also an input to instantaneous roll angle reference block 72. Other inputs to instantaneous roll angle reference block 72 include the compensated and filtered yaw rate from FIG. 4 and the filtered lateral acceleration signal from FIG. 6. The following formula is used to determine a reference roll angle:

ReferenceRollAngle=$ARC$Sin[1/g($VCG$*$YR$CompFlt−LatAccFlt)]

Where g is the gravitational constant 0.9.81 m/s$^2$.

The reference roll angle from block 72 is also an input to roll angle estimate offset compensation. The updated roll angle estimation is given by the formula:

$$RollAngleEst = RollAngleEst\,(\text{from Block 68}) + (ReferenceRollAngle - RollAngleEst(\text{Block 68}))\frac{looptime}{Tau}$$

Where Tau is a time constant and may be a function of steering velocity, LatAcc and V-CG. A suitable time constant may, for example, be 30 seconds.

Referring now to FIG. 8, a relative roll angle estimation (RelativeRollAngleEst) and a road bank angle estimate signal is determined. The first step of the relative roll angle calculation involves the determination of road bank angle compensation time constant (Tau) block 72. The velocity at the center of gravity, the steering velocity and the filtered lateral acceleration signal from FIG. 6 are used as inputs. A compensated and filtered roll rate (RR_CompFlt) is used as an input to a differentiator 74 to determine the roll acceleration (Roll Acc). Differentiator 74 takes the difference between the compensated and filtered roll rate signal from the previous loop and the compensated and filtered roll rate from the current loop divided by the loop time to attain the roll acceleration. The roll acceleration signal is coupled to a low pass filter 76. The filtered roll acceleration signal (Roll Acc Flt), roll angle estimate, the filtered lateral acceleration signal and the loop time are coupled to chassis relative roll observer block 78. The chassis roll observer 78 determines the model roll angle estimation (Model. Roll Angle Est). The model roll angle is a stable estimation of the roll dynamics of the vehicle which allows the estimates to converge to a stable condition over time.

From the model roll angle estimation from block 78, the initial relative roll angle estimation from block 72, a road bank angle initialization from a block 79 loop time and a roll angle estimate, road bank angle compensation block 80 determines a new road bank angle estimate. The formula for road bank angle is:

$$RoadBankAngleEst =$$

$$\frac{LoopTime}{TauRoad\_Bank} * \left( RollAngleEst - \left( \begin{matrix} ModelRollAngle + \\ RoadBankAngleEst \end{matrix} \right) \right)$$

The roll angle estimate may be summed with the road bank angle estimate from block 80 in summer 82 to obtain a relative roll angle estimate. The road bank angle estimate may be used by other dynamic control systems.

Figure 9:
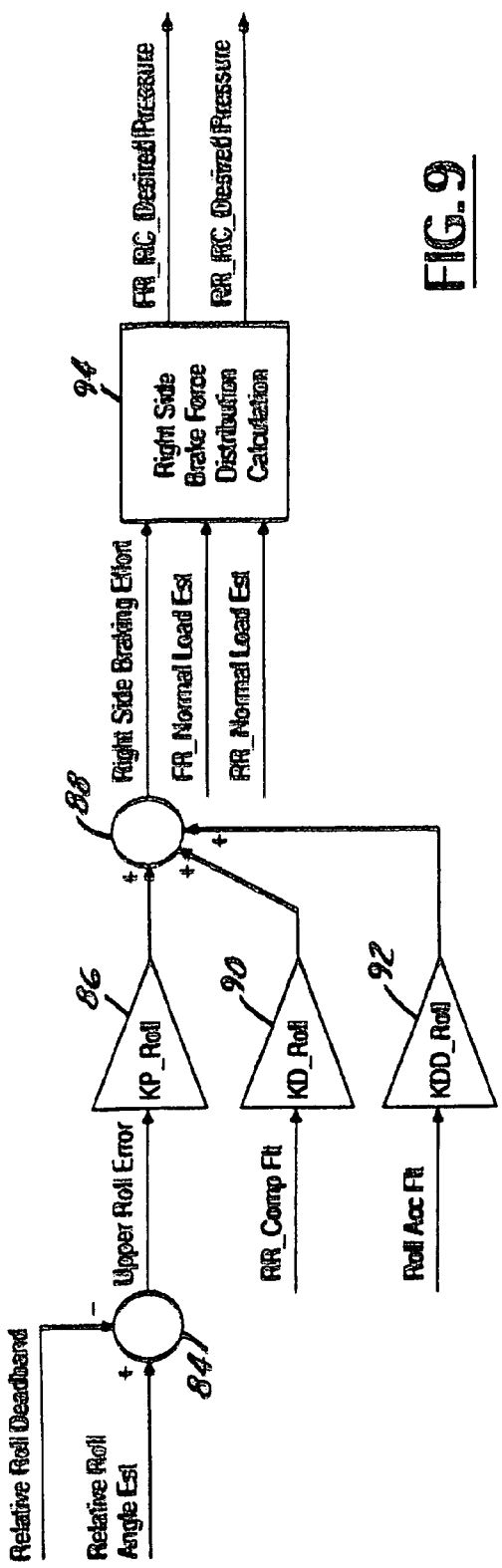
FIG. 9 is a flow chart of system feedback for the right side of the vehicle resulting in brake distribution force.

Referring now to FIG. 9, the relative roll angle estimate from FIG. 8 and a relative roll deadband are summed in summer 84 to obtain an upper roll error. The upper roll error is amplified in KP_Roll Amplifier 86 and is coupled to summer 88. The roll rate compensated and filtered signal from FIG. 5 is coupled to KD_Roll Amplifier 90. The amplified roll rate signal is coupled to summer 88. The filtered roll acceleration signal from block 8 is coupled to KDD_Roll Amplifier 82. The amplified signal is also coupled to summer 88. The proportioned sum of the amplified signals is the right side braking force effort. From this, the right side brake force distribution calculation block 94 is used to determine the distribution of brake pressure between the front and rear wheels. The front right normal load estimate and the rear right normal load estimate are inputs to block 94. The front right roll control desired pressure and the right rear roll control desire pressure are outputs of block 94. The block 94 proportions the pressure between the front right and rear right signals to prevent roll. The front right, for example, is proportional according to the following formula:

$$FR \text{ desired pressure} = Right \text{ side braking effort} \left( \frac{FRNormal}{FR + RR} \right)$$

The output of block 94 is used by the brake controller of FIG. 3 to apply brake pressure to the front right and rear right wheels. The brake controller factors in inputs such as the brake pressure currently applied to the vehicle through the application of pressure by the driver on the brake pedal. Other inputs include inputs from other dynamic control systems such as a yaw control system.

Figure 10:
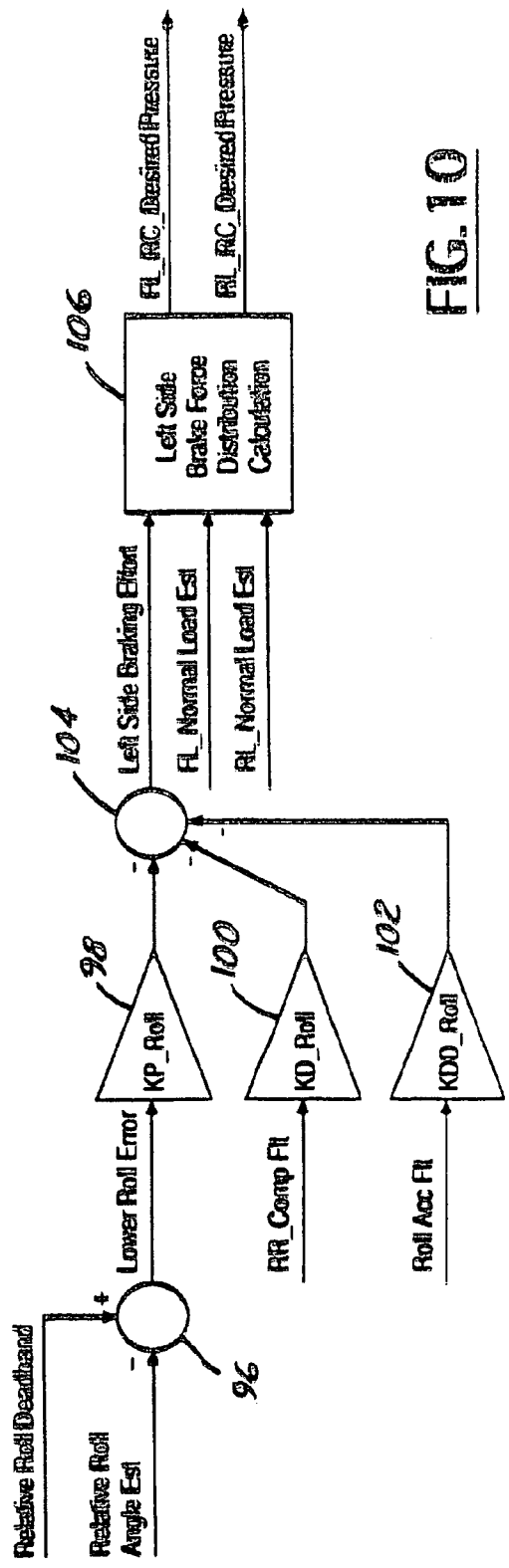
FIG. 10 is a flow chart of system feedback for the left side of the vehicle.

Referring now to FIG. 10, a similar calculation to that of FIG. 9 is performed for the left side of the vehicle. The relative roll angle estimate and relative roll deadband are inputs to summing block 96. However, the signs are changed to reflect that the left side of the vehicle is a negative side of the vehicle. Therefore, relative roll angle estimate and relative roll deadband are purely summed together 96 in summing block 96 to obtain the lower roll error. The lower roll error is passed through KP_Roll amplifier 98. The compensated and filtered roll rate is passed through KD_Roll amplifier 100 and the filtered roll acceleration signal is passed through KDD_Roll amplifier 102. The inverse of the signals from amplifiers 98, 100 and 102 are input and summed in summer 104 to obtain the left side braking effort.

A left side brake force distribution calculation block 106 receives the left side braking effort from summer 104. The front left normal load estimate and the rear left normal load estimate. In a similar manner to that above, the front left and rear left roll control brake pressures are determined. By properly applying the brakes to the vehicle, the tire moment is reduced and the net moment of the vehicle is counter to a roll direction to reduce the roll angle and maintain the vehicle in a horizontal plane.

Figure 11:
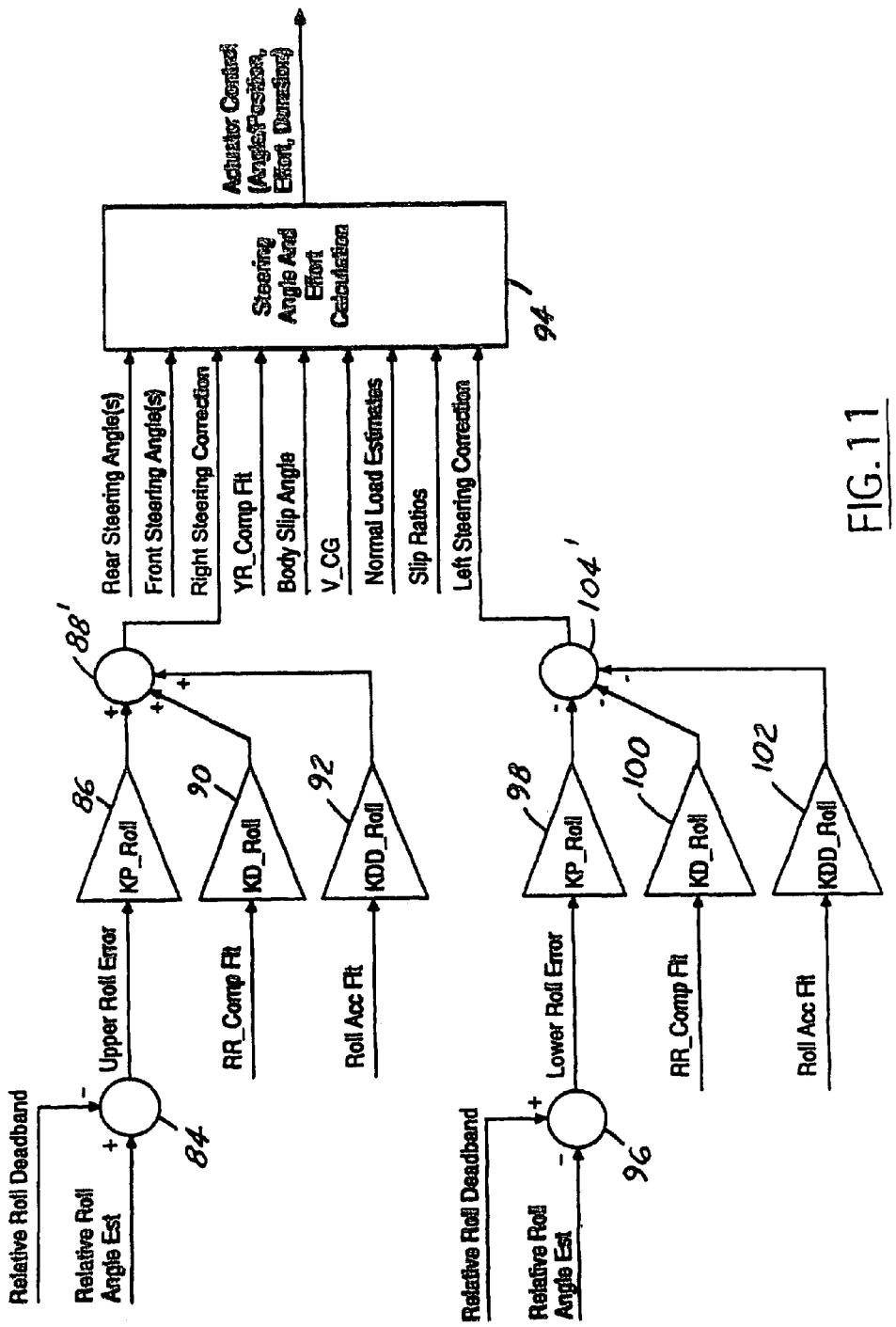
FIG. 11 is a flow chart of another embodiment similar to that of FIGS. 9 and 10 resulting in change in steering position.

Referring now to FIG. 11, a change in steering angle may be effectuated rather than or in combination with a change in brake force distribution. In either case, however, the tire force vector is changed. In FIG. 11, the same reference numerals as those in FIGS. 9 and 10 are used but are primed. Everything prior to blocks 88' and 104' is identical. Blocks 88' and 104' determine right side steering effort and left side steering effort, respectively.

The proportioned sum of the amplified signals is the right side steering tire correction. The rear (and front) steering actuator control signals are calculated from the tire corrections, the front and rear steer angles or the actuator positions, the vehicle side slip angle, the vehicle yaw rate and vehicle speed. Increased accuracy and robustness can be achieved by including tire normal load estimates and/or tire slip ratios. In the steering angle and effort correction block 94, the tire slip angles are calculated and used to determine the corrections to the rear (and front) steer angles that will reduce the tire lateral forces and reduce the vehicle roll angle. Block 94 also calculates the actuator control signals necessary to achieve the desired tire steering corrections.

The measured steering actuator positions are inputs to block 94. The change in the actuator direction and effort amounts and duration are outputs of block 94. The block 94 determines the appropriate direction and force amount to apply to the steering actuators to prevent roll.

The output of block 94 is used by the steering controller 38 of FIG. 3 to apply the desired steering to the front and/or rear wheels depending on the type of steering system. The steering controller factors in inputs such as the current steering position and the dynamics of the vehicle. Other inputs may include inputs from other dynamic control systems such as a yaw control system. In a production ready embodiment, the vehicle design characteristics will be factored into the desired control based on the sensor outputs.

The bottom portion of FIG. 9 is similar to the top, however, the signs are changed to reflect that the left side of the vehicle is a negative side of the vehicle. Therefore, relative roll angle estimate and relative roll deadband are purely summed together 96 in summing block 96 to obtain the lower roll error. The lower roll error is passed through KP_Roll amplifier 98. The compensated and filtered roll rate is passed through KD_Roll amplifier 100 and the filtered roll acceleration signal is passed through KDD_Roll amplifier 102. The inverse of the signals from amplifiers 98, 100 and 102 are input and summed in summer 104 to obtain the desired left actuator control.

By properly applying a desired steering control to the vehicle, the tire moment is reduced and the net moment of the vehicle is counter to a roll direction to reduce the roll angle and maintain the vehicle in a horizontal plane.

If both steering and brake distribution are used controller 26 will be used to apportion the amount of correction provided by steering and brake distribution. The amount of apportionment will depend on the roll rate and other variables for the particular vehicle. The amount of apportionment will thus be determined for each vehicle. For example, higher profile vehicles will be apportioned differently from a low profile vehicle.

In operation, various types of steering control may be performed depending on the vehicle characteristics and the steering system. For example, as described above a rack system may be controlled to provide a desired change in the rear steering angle temporarily to prevent rollover while leaving the front wheels unchanged. Of course, the direction of the front wheels could also be change when the rear direction is changed.

In a system having independently actuable front wheels, the relative steering angle between the front wheels may be changed in response to detected roll by steering control 38 without changing the position or controlling the position of the rear wheel. This may be done by independent control of the front wheels or simultaneous control of the front wheels.

In a system having independently actuable rear wheels, the relative steering angle between the front wheels may be changed in response to detected roll by steering control 38 without changing the position or controlling the position of the front wheels. This may be done by independent control of the rear wheels or simultaneous control of the rear wheels.

As described above the longitudinal acceleration sensor and a pitch rate sensor may be incorporated into the above tire force vector determination. These sensors may be used as a verification as well as an integral part of the calculations. For example, the pitch rate or the longitudinal acceleration or both can be used to construct a vehicle pitch angle estimate. This estimate along with its derivative can be used to improve the calculation of the vehicle roll angle. An example of how the rate of change of the vehicle roll angle using theses variables may be constructed is:

Global$RR$≈$RR$Comp_Flt+PitchRateCompFlt(−YawRate+Sin (GlobalRollAngleEst)*Tan (VehiclePitchAngleEst))+(YawRateCompFlt*Cos (Global$RR$)*Tan (PitchAngleEst))

Where PitchRateCompFlt is a compensated and filtered pitch rate signal, GlobalRollAngleEst is an estimated global roll angle, VehiclePitchAngleEst is an estimated vehicle pitch angle estimate, and GlobalRR is a global roll rate signal. Of course, those skilled in the art may vary the above based upon various other factors depending on the particular system needs.

While particular embodiments of the invention have been shown and described, numerous variations and alternate embodiments will occur to those skilled in the art. Accordingly, it is intended that the invention be limited only in terms of the appended claims.

The invention claimed is:

1. A method of controlling roll stability of a vehicle comprising the steps of:
   determining a roll angle of the vehicle; and
   reducing a tire force vector in response to roll angle to prevent the vehicle from rolling over.

2. A method as recited in claim 1 wherein determining a roll angle comprises determining a roll angle in response to a lateral acceleration.

3. A method as recited in claim 1 determining a roll angle comprises determining a roll angle in response to a lateral acceleration and yaw rate.

4. A method as recited in claim 1 determining a roll angle comprises determining a roll angle in response to a lateral acceleration, yaw rate vehicle speed.

5. A method as recited in claim 1 wherein determining a roll angle comprises determining a lateral acceleration and a steering velocity.

6. A method as recited in claim 1 wherein determining a roll angle comprises determining a roll angle in response to a roll rate.

7. A method as recited in claim 1 wherein determining a roll angle comprises determining a roll angle in response to a vehicle speed.

8. A method as recited in claim 1 wherein determining a roll angle comprises determining a roll angle in response to a yaw rate a pitch angle.

9. A method as recited in claim 1 wherein determining a roll angle comprises determining a roll angle in response to a pitch rate.

10. A method as recited in claim 1 wherein determining a roll angle comprises determining a roll angle in response to a pitch angle.

11. A method as recited in claim 1 wherein determining a roll angle comprises determining a roll angle in response to a global positioning system signal.

12. A method as recited in claim 1 wherein determining a roll angle comprises determining a roll angle in response to a steering angle.

13. A method as recited in claim 1 wherein determining a roll angle comprises determining a roll angle in response to a steering velocity.

14. A method as recited in claim 1 wherein determining a roll angle comprises determining a roll angle in response to a wheel speed.

15. A method as recited in claim 1 wherein determining a roll angle comprises determining a roll angle in response to a wheel normal load estimate.

16. A method as recited in claim 1 wherein determining a roll angle comprises determining a roll angle in response to a road bank angle.

17. A method as recited in claim 1 wherein determining a roll angle comprises determining a roll angle in response to a roll acceleration.

18. A method as recited in claim 1 wherein determining a roll angle comprises determining a roll angle in response to a longitudinal acceleration.

19. A method as recited in claim 1 wherein determining a roll angle comprises determining a roll angle in response to a reference roll angle.

20. A method as recited in claim 1 wherein determining a roll angle comprises determining a roll angle in response to a relative roll angle.

21. A method as recited in claim 1 wherein determining a roll angle comprises determining a roll angle in response to a road bank angle and a previous roll angle estimate.

22. A method as recited in claim 1 wherein determining a roll angle comprises determining a roll angle in response to a road bank angle and a reference roll angle.

23. A method as recited in claim 1 wherein determining a roll angle comprises determining a roll angle in response to a body roll angle initialization.

24. A method as recited in claim 23 wherein the body roll angle initialization is determined in response to a roll angle estimate and a lateral acceleration.

25. A method as recited in claim 1 wherein determining a roll angle comprises determining a roll angle in response to an instantaneous roll angle reference.

26. A method as recited in claim 25 wherein the instantaneous roll angle reference is determined in response to a vehicle speed, a yaw rate and a lateral acceleration.

27. A method as recited in claim 1 wherein determining a roll angle comprises determining a roll angle in response to a roll angle estimate.

28. A method as recited in claim 27 wherein the roll angle estimate is determined in response to a reference roll angle and a body roll integration.

29. A method as recited in claim 1 wherein determining a roll angle comprises determining a roll angle in response to a model roll angle.

30. A method as recited in claim 29 wherein the model roll angle is determined in response to a chassis roll observer.

31. A method as recited in claim 1 wherein determining a roll angle comprises determining a roll angle in response to a road bank angle time constant.

32. A method as recited in claim 31 wherein the road bank angle time constant is determined in response to a steering velocity, a lateral acceleration and a vehicle speed.

33. A method as recited in claim 1 wherein determining a roll angle comprises determining a roll angle in response to body slip.

34. A method of controlling roll stability of a vehicle comprising the steps of:
   determining a roll angle estimate; and
   reducing a tire force vector in response to roll angle estimate to prevent the vehicle from rolling over.

35. A method as recited in claim 34 determining a roll angle comprises determining a roll angle estimate in response to a lateral acceleration.

36. A method as recited in claim 34 determining a roll angle estimate comprises determining a roll angle estimate in response to a lateral acceleration and a yaw rate.

37. A method as recited in claim 34 determining a roll angle estimate comprises determining a roll angle estimate in response to a lateral acceleration, a vehicle speed and a yaw rate.

38. A method as recited in claim 34 wherein determining a roll angle estimate comprises determining a lateral acceleration and a steering velocity.

39. A method as recited in claim 34 determining a roll angle estimate comprises determining a roll angle estimate in response to a roll rate.

40. A method as recited in claim 34 determining a roll angle estimate comprises determining a roll angle estimate in response to a vehicle speed.

41. A method as recited in claim 34 determining a roll angle estimate comprises determining a roll angle estimate in response to a yaw rate a pitch angle.

42. A method as recited in claim 34 determining a roll angle estimate comprises determining a roll angle estimate in response to a pitch rate.

43. A method as recited in claim 34 determining a roll angle estimate comprises determining a roll angle estimate in response to a pitch angle.

44. A method as recited in claim 34 determining a roll angle estimate comprises determining a roll angle estimate in response to a global positioning system signal.

45. A method as recited in claim 34 determining a roll angle estimate comprises determining a roll angle estimate in response to a steering angle.

46. A method as recited in claim 34 determining a roll angle estimate comprises determining a roll angle estimate in response to a steering velocity.

47. A method as recited in claim 34 determining a roll angle estimate comprises determining a roll angle estimate in response to a wheel speed.

48. A method as recited in claim 34 determining a roll angle estimate comprises determining a roll angle estimate in response to a wheel normal load estimate.

49. A method as recited in claim 34 determining a roll angle estimate comprises determining a roll angle estimate in response to a road bank angle.

50. A method as recited in claim 34 determining a roll angle estimate comprises determining a roll angle estimate in response to a roll acceleration.

51. A method as recited in claim 34 determining a roll angle estimate comprises determining a roll angle estimate in response to a longitudinal acceleration.

52. A method as recited in claim 34 wherein determining a roll angle estimate comprises determining a roll angle estimate in response to a reference roll angle.

53. A method as recited in claim 34 determining a roll angle estimate comprises determining a roll angle estimate in response to a relative roll angle.

54. A method as recited in claim 34 wherein determining a roll angle estimate comprises determining a roll angle estimate in response to a road bank angle and a previous roll angle estimate.

55. A method as recited in claim 34 wherein determining a roll angle estimate comprises determining a roll angle estimate in response to a road bank angle and a reference roll angle.

56. A method as recited in claim 34 wherein determining a roll angle estimate comprises determining a roll angle estimate in response to a body roll angle initialization.

57. A method as recited in claim 34 wherein the body roll angle initialization is determined in response to a lateral acceleration.

58. A method as recited in claim 34 wherein determining a roll angle estimate comprises determining a roll angle estimate in response to an instantaneous roll angle reference.

59. A method as recited in claim 58 wherein the instantaneous roll angle reference is determined in response to a vehicle speed, a yaw rate and a lateral acceleration.

60. A method as recited in claim 34 wherein the roll angle estimate is determined in response to a reference roll angle and a body roll integration.

61. A method as recited in claim 34 wherein determining a roll angle comprises determining a roll angle in response to a model roll angle.

62. A method as recited in claim 61 wherein the model roll angle is determined in response to a chassis roll observer.

63. A method as recited in claim 34 wherein determining a roll angle estimate comprises determining a roll angle estimate in response to a road bank angle time constant.

64. A method as recited in claim 63 wherein the road bank angle time constant is determined in response to a steering velocity, a lateral acceleration and a vehicle speed.

65. A method as recited in claim 34 wherein determining a roll angle estimate comprises determining a roll angle estimate in response to body slip.

66. A method of controlling roll stability of a vehicle comprising the steps of:
   determining a roll responsive control signal;
   reducing a tire force vector in response to roll angle to prevent the vehicle from rolling over.

67. A method as recited in claim 66 wherein determining a roll angle comprises determining a roll responsive control signal in response to a lateral acceleration.

68. A method as recited in claim 66 wherein determining a roll responsive control signal comprises determining a roll responsive control signal in response to a lateral acceleration and a yaw rate.

69. A method as recited in claim 66 wherein determining a roll responsive control signal comprises determining a roll responsive control signal in response to a lateral acceleration, a vehicle speed and a yaw rate.

70. A method as recited in claim 66 wherein determining a roll responsive control signal comprises determining a roll responsive control signal in response to a roll rate.

71. A method as recited in claim 66 wherein determining a roll responsive control signal comprises determining a roll responsive control signal in response to a vehicle speed.

72. A method as recited in claim 66 wherein determining a roll responsive control signal comprises determining a roll responsive control signal in response to a yaw rate a pitch angle.

73. A method as recited in claim 66 wherein determining a roll responsive control signal comprises determining a roll responsive control signal in response to a pitch rate.

74. A method as recited in claim 66 wherein determining a roll responsive control signal comprises determining a roll responsive control signal in response to a pitch angle.

75. A method as recited in claim 66 wherein determining a roll responsive control signal comprises determining a roll responsive control signal in response to a global positioning system signal.

76. A method as recited in claim 66 wherein determining a roll responsive control signal comprises determining a roll responsive control signal in response to a steering angle.

77. A method as recited in claim 66 wherein determining a roll responsive control signal comprises determining a roll responsive control signal in response to a steering velocity.

78. A method as recited in claim 66 wherein determining a roll responsive control signal comprises determining a roll responsive control signal in response to a wheel speed.

79. A method as recited in claim 66 wherein determining a roll responsive control signal comprises determining a roll responsive control signal in response to a wheel normal load estimate.

80. A method as recited in claim 66 wherein determining a roll responsive control signal comprises determining a roll responsive control signal in response to a road bank angle.

81. A method as recited in claim 66 wherein determining a roll responsive control signal comprises determining a roll responsive control signal in response to a roll acceleration.

82. A method as recited in claim 66 wherein determining a roll responsive control signal comprises determining a roll responsive control signal in response to a longitudinal acceleration.

83. A method as recited in claim 66 wherein determining a roll responsive control signal comprises determining a roll responsive control signal in response to a roll angle.

84. A method as recited in claim 66 wherein determining a roll responsive control signal comprises determining a roll responsive control signal in response to a reference roll angle.

85. A method as recited in claim 66 wherein determining a roll responsive control signal comprises determining a roll responsive control signal in response to a relative roll angle.

86. A method as recited in claim 66 wherein determining a roll responsive control signal comprises determining a roll responsive control signal in response to a road bank angle and a previous roll angle estimate.

87. A method as recited in claim 66 wherein determining a roll responsive control signal comprises determining a roll responsive control signal in response to a road bank angle and a reference roll angle.

88. A method as recited in claim 66 wherein determining a roll responsive control signal comprises determining a roll responsive control signal in response to a body roll angle initialization.

89. A method as recited in claim 66 wherein determining a roll responsive control signal comprises determining a roll responsive control signal in response to a model roll angle.

90. A method as recited in claim 89 wherein the model roll responsive control signal is determined in response to a chassis roll observer.

91. A method as recited in claim 66 wherein determining a roll responsive control signal comprises determining a roll responsive control signal in response to a road bank angle time constant.

92. A method as recited in claim 91 wherein the road bank angle time constant is determined in response to a steering velocity, a lateral acceleration and a vehicle speed.

93. A method as recited in claim 66 wherein determining a roll responsive control signal comprises determining a roll responsive control signal in response to body slip.

94. A method of controlling roll stability of a vehicle comprising the steps of:
determining a vehicle roll condition; and
reducing a tire force vector in response to the vehicle roll condition to prevent the vehicle from rolling over.

95. A method as recited in claim 94 wherein determining a vehicle roll condition comprises determining a vehicle roll condition in response to a lateral acceleration.

96. A method as recited in claim 94 wherein determining a vehicle roll condition comprises determining a vehicle roll condition in response to a lateral acceleration and a yaw rate.

97. A method as recited in claim 94 wherein determining a vehicle roll condition comprises determining a vehicle roll condition in response to a lateral acceleration, a vehicle speed and a yaw rate.

98. A method as recited in claim 94 wherein determining a vehicle roll condition comprises determining a lateral acceleration and a steering velocity.

99. A method as recited in claim 94 wherein determining a vehicle roll condition comprises determining a vehicle roll condition in response to a roll rate.

100. A method as recited in claim 94 wherein determining a vehicle roll condition comprises determining a vehicle roll condition in response to a vehicle speed.

101. A method as recited in claim 94 wherein determining a vehicle roll condition comprises determining a vehicle roll condition in response to a yaw rate a pitch angle.

102. A method as recited in claim 94 wherein determining a vehicle roll condition comprises determining a vehicle roll condition in response to a pitch rate.

103. A method as recited in claim 94 wherein determining a vehicle roll condition comprises determining a vehicle roll condition in response to a pitch angle.

104. A method as recited in claim 94 wherein determining a vehicle roll condition comprises determining a vehicle roll condition in response to a global positioning system signal.

105. A method as recited in claim 94 wherein determining a vehicle roll condition comprises determining a vehicle roll condition in response to a steering angle.

106. A method as recited in claim 94 wherein determining a vehicle roll condition comprises determining a vehicle roll condition in response to a steering velocity.

107. A method as recited in claim 94 wherein determining a vehicle roll condition comprises determining a vehicle roll condition in response to a wheel speed.

108. A method as recited in claim 94 wherein determining a vehicle roll condition comprises determining a vehicle roll condition in response to a wheel normal load estimate.

109. A method as recited in claim 94 wherein determining a vehicle roll condition comprises determining a vehicle roll condition in response to a road bank angle.

110. A method as recited in claim 94 wherein determining a vehicle roll condition comprises determining a vehicle roll condition in response to a roll acceleration.

111. A method as recited in claim 94 wherein determining a vehicle roll condition comprises determining a vehicle roll condition in response to a longitudinal acceleration.

112. A method as recited in claim 94 wherein determining a vehicle roll condition comprises determining a vehicle roll condition in response to a roll angle.

113. A method as recited in claim 94 wherein determining a vehicle roll condition comprises determining a vehicle roll condition in response to a reference roll angle.

114. A method as recited in claim 94 wherein determining a vehicle roll condition comprises determining a vehicle roll condition in response to a relative roll angle.

115. A method as recited in claim 94 wherein determining a vehicle roll condition comprises determining a vehicle roll condition in response to a road bank angle and a previous roll angle estimate.

116. A method as recited in claim 94 wherein determining a vehicle roll condition comprises determining a vehicle roll condition in response to a road bank angle and a reference roll angle.

117. A method as recited in claim 94 wherein determining a vehicle roll condition comprises determining a vehicle roll condition in response to a body roll angle initialization.

118. A method as recited in claim 117 wherein the body roll angle initialization is determined in response to a roll angle estimate and a lateral acceleration.

119. A method as recited in claim 94 wherein determining a vehicle roll condition comprises determining a vehicle roll condition in response to an instantaneous roll angle reference.

120. A method as recited in claim 119 wherein the instantaneous roll angle reference is determined in response to a vehicle speed, a yaw rate and a lateral acceleration.

121. A method as recited in claim 94 wherein determining a vehicle roll condition comprises determining a vehicle roll condition in response to a roll angle estimate.

122. A method as recited in claim 94 wherein the roll angle estimate is determined in response to a reference roll angle and a body roll integration.

123. A method as recited in claim 94 wherein determining a vehicle roll condition comprises determining a vehicle roll condition in response to a model roll angle.

124. A method as recited in claim 123 wherein the model roll angle is determined in response to a chassis roll observer.

125. A method as recited in claim 94 wherein determining a vehicle roll condition comprises determining a vehicle roll condition in response to a road bank angle time constant.

126. A method as recited in claim 125 wherein the road bank angle time constant is determined in response to a steering velocity, a lateral acceleration and a vehicle speed.

127. A method as recited in claim 94 wherein determining a vehicle roll condition comprises determining a vehicle roll condition in response to body slip.

* * * * *